US010671102B2

(12) United States Patent
Kawai et al.

(10) Patent No.: US 10,671,102 B2
(45) Date of Patent: Jun. 2, 2020

(54) AIR CONDITIONER PROVIDED WITH REMOTE CONTROLLER HAVING TEMPERATURE SENSOR

(71) Applicant: FUJITSU GENERAL LIMITED, Kawasaki-Shi (JP)

(72) Inventors: Tomofumi Kawai, Kanagawa (JP); Yutaka Shimamura, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 583 days.

(21) Appl. No.: 14/358,553

(22) PCT Filed: Nov. 12, 2012

(86) PCT No.: PCT/JP2012/079235
§ 371 (c)(1),
(2) Date: May 15, 2014

(87) PCT Pub. No.: WO2013/073493
PCT Pub. Date: May 23, 2013

(65) Prior Publication Data
US 2014/0312130 A1   Oct. 23, 2014

(30) Foreign Application Priority Data
Nov. 16, 2011   (JP) .................. 2011-251163

(51) Int. Cl.
*G05D 23/19* (2006.01)
*F24F 11/30* (2018.01)
(Continued)

(52) U.S. Cl.
CPC .............. *G05D 23/19* (2013.01); *F24F 11/30* (2018.01); *F24F 11/62* (2018.01); *F24F 11/56* (2018.01); *F24F 2110/10* (2018.01)

(58) Field of Classification Search
CPC . G05D 23/19; G05D 23/1905; F24F 11/0012; F24F 11/006; F24F 11/0086;
(Continued)

(56) References Cited

U.S. PATENT DOCUMENTS 5,135,045 A * 8/1992 Moon ................. F24F 11/0009
165/260
5,410,890 A * 5/1995 Arima ................. F24F 11/0009
236/78 D
(Continued)

FOREIGN PATENT DOCUMENTS

CN      201514001 U    6/2010
EP      1445550 A1     8/2004
(Continued)

OTHER PUBLICATIONS

Extended European Search Report dated Oct. 12, 2015 issued in European Patent Application No. 12849809.4.
(Continued)

*Primary Examiner* — Henry T Crenshaw
(74) *Attorney, Agent, or Firm* — McDermott Will & Emery LLP

(57) ABSTRACT

An air conditioner includes an air-conditioner body performing air-conditioning operation, and a remote controller to operate the air-conditioner body. The air-conditioner body includes control unit that performs operation control of the air-conditioner body, and body receiving unit that receives a transmission signal from the remote controller. The remote controller includes temperature detecting unit for detecting temperatures around the remote controller, and remote-controller transmission unit. At the time of cooling operation, the control unit compares the detected temperature received from the remote controller and a preset temperature predetermined. When the detected temperature is lower than the preset temperature, the control unit operates the air-
(Continued)

conditioner body so as to reduce a temperature difference between the detected temperature and the preset temperature, or when the detected temperature is equal to or higher than the preset temperature, the control unit operates the air-conditioner body based on the preset temperature.

6 Claims, 3 Drawing Sheets

(51) Int. Cl.
    *F24F 11/62*     (2018.01)
    *F24F 110/10*    (2018.01)
    *F24F 11/56*     (2018.01)

(58) Field of Classification Search
    CPC ............... F24F 1/00; F24F 2011/0068; F24F 2011/0073; F24F 2011/0075; F24F 2011/0091
    See application file for complete search history.

(56) References Cited

U.S. PATENT DOCUMENTS

| | | | |
|---|---|---|---|
| 2004/0020226 A1* | 2/2004 | Bash | F25B 5/02 62/229 |
| 2009/0140058 A1* | 6/2009 | Koster | F24F 11/006 236/49.3 |
| 2009/0140060 A1* | 6/2009 | Stoner | G05D 23/1934 236/51 |
| 2010/0245094 A1* | 9/2010 | Tan | F24F 11/0012 340/586 |
| 2011/0130881 A1* | 6/2011 | Nanami | F24F 3/044 700/277 |

FOREIGN PATENT DOCUMENTS

| | | | | |
|---|---|---|---|---|
| GB | 2480009 A | * | 11/2011 | ......... F24D 19/1009 |
| JP | 2001-153439 A | | 6/2001 | |
| JP | 2002-206791 A | | 7/2002 | |
| JP | 2005-315488 A | | 11/2005 | |
| JP | 2008-241185 A | | 10/2008 | |
| JP | 2010-164231 A | | 7/2010 | |
| JP | 2010164231 A | | 7/2010 | |

OTHER PUBLICATIONS

International Search Report issued in Application No. PCT/JP2012/079235 dated Feb. 12, 2013.
International Search Report issued in Application No. PCT/JP2012/079235 dated Feb. 13, 2013.
Chinese Office Action dated Mar. 21, 2016 issued in Chinese Patent Application No. 201280054891.8.

* cited by examiner (COOLING OPERATION)

(HEATING OPERATION)

AIR CONDITIONER PROVIDED WITH REMOTE CONTROLLER HAVING TEMPERATURE SENSOR

CROSS-REFERENCE TO RELATED APPLICATIONS

The present application is the U.S. National Phase of PCT/JP2012/079235 dated Nov. 12, 2012 which claims priority from Japanese Patent Application No. 2011-251163 filed Nov. 16, 2011; the subject matter of each is incorporated herein by reference in entirety.

FIELD

The present invention relates to the operation control of an air conditioner provided with a remote controller having a temperature sensor.

BACKGROUND

There has been known a remote controller, which performs remote control of an air conditioner and/or sets various parameters such as a preset temperature (see, for example, Patent Literature 1). The remote controller disclosed in Patent Literature 1 includes a remote-control transmission section which transmits an operation signal to an air-conditioner body by using an infrared ray system, and a temperature sensor which detects temperatures of an area closer to the presence of a person. The remote controller is configured to periodically transmit a room temperature detected by the temperature sensor to the air-conditioner body.

In this configuration, when the room temperature measured with the temperature sensor of the remote controller becomes substantially equal to a preset temperature preset at the air-conditioner body side, for example, when the room temperature becomes the preset temperature ±0.5° C., operation of the air-conditioner body is stopped to shift the air-conditioner body to a standby state. While a temperature difference between the room temperature measured with the temperature sensor and the preset temperature becomes equal to a predetermined temperature or more, the air-conditioner body is shifted to an operation mode to perform operation control so that the room temperature reaches the preset temperature. Thereby, the air-conditioner body is prevented from being operated endlessly, to reduce power consumption of the air-conditioner body.

CITATION LIST

Patent Literature

Patent Document 1: Japanese Laid-open Patent Publication No. 2010-164231

SUMMARY

Technical Problem

In the case of an RF remote controller using an radio wave, a communications area is wider than that of a conventional infrared ray communication system. Therefore, it becomes possible to operate the air-conditioner body from places such as rooms other than the room where the air-conditioner body (air-conditioner indoor unit) is installed. Accordingly, the remote controller is expected to be placed in places such as rooms other than the room where the air-conditioner indoor unit is installed.

When the remote controller is placed in places other than the room where the air-conditioner indoor unit is installed, the temperature detected by the temperature sensor included in the remote controller is not indicative of the room temperature of the room which is air-conditioned by the air-conditioner indoor unit. Therefore, in the case where the remote controller of the air conditioner, as disclosed in Patent Literature 1, is replaced with an RF remote controller, the temperature detected by the temperature sensor of the remote controller is unchanged even when the air-conditioner indoor unit performs such control as increasing operating power in attempting to reduce the difference between the temperature detected by the temperature sensor and the preset temperature. This may cause useless air-conditioning operation. From the viewpoint of energy saving, such operation control is preferably performed only when the remote controller is actually present in the room which is an air-conditioning target of the air-conditioner indoor unit.

The present invention has been made in view of the above circumstances, and it is an object of the present invention to provide an air conditioner, which regards a temperature detected by a temperature sensor included in an RF remote controller as a room temperature and performs operation control based on the room temperature, being capable of preventing useless cooling operation in the case where the remote controller is not present in a room which is an air-conditioning target of an air-conditioner indoor unit.

Solution to Problem

According to an aspect of the present invention, an air conditioner includes: an air-conditioner body that performs air-conditioning operation; and a remote controller that operates the air-conditioner body, wherein the air-conditioner body includes control unit that performs operation control of the air-conditioner body, and body receiving unit that receives a transmission signal from the remote controller, the remote controller includes temperature detecting unit that detects a temperature around the remote controller, and remote-controller transmission unit that transmits the temperature detected by the temperature detecting unit as a transmission signal by means of an radio wave at predetermined time intervals, and at a time of cooling operation, the control unit compares the detected temperature received from the remote controller and a preset temperature predetermined, and when the detected temperature is lower than the preset temperature, the control unit operates the air-conditioner body so as to reduce a temperature difference between the detected temperature and the preset temperature, or when the detected temperature is equal to or higher than the preset temperature, the control unit operates the air-conditioner body based on the preset temperature.

According to another aspect of the present invention, the air-conditioner body includes timer unit, and when the temperature difference between the detected temperature and the preset temperature is equal to or more than a first predetermined temperature and the timer unit counts a first predetermined period for which a state of the first predetermined temperature has continued, the control unit operates the air-conditioner body based on the preset temperature.

According to another aspect of the present invention, the air-conditioner body includes timer unit, and when the control unit receives the detected temperature from the remote controller and when the detected temperature has changed by a second predetermined temperature or more within a second predetermined period counted by the timer unit, the control unit operates the air-conditioner body based on the preset temperature.

According to another aspect of the present invention, the air-conditioner body includes body transmission unit that transmits a response signal to the remote controller in response to reception of the transmission signal transmitted from the remote controller, the remote controller includes remote-controller receiving unit that receives the response signal, the remote controller transmits the temperature detected by the temperature detecting unit as a transmission signal, and when the remote controller fails to receive the response signal from the air-conditioner body, the remote controller stops transmitting a subsequent detected temperature as a transmission signal.

Advantageous Effects of Invention

When a detected temperature is higher than a preset temperature at the time of cooling operation, operation control (control to increase the cooling capacity) of the air-conditioner body is performed so as to reduce the temperature difference. In this case, if the remote controller is not in an air-conditioning target room, the temperature difference is not reduced no matter how long the cooling operation is performed, while the air-conditioning target room is excessively cooled since the detected temperature is not indicative of the room temperature of the air-conditioning target room. According to the air conditioner of the present invention, in order to prevent such useless operation, air-conditioning operation by the air-conditioner body is controlled (controlled to decrease the cooling capacity) so as to reduce the temperature difference between the preset temperature and the detected temperature, only when at least the detected temperature is lower than the preset temperature.

According to another air conditioner of the present invention, when a temperature difference between the detected temperature and the preset temperature is equal to or more than a first predetermined temperature and the state of the first predetermined temperature has continued for a predetermined first period, the air-conditioner body determines that the remote controller is not in the air-conditioning target room, and performs air-conditioning operation based on the preset temperature. As a result, even when the remote controller is not in the air-conditioning target room, the air-conditioning target room is not excessively cooled, so that useless operation can be prevented.

According to another air conditioner of the present invention, when the detected temperature has changed by a second predetermined temperature or more during a second predetermined period, the air-conditioner body determines that the remote controller is moved out of the air-conditioning target room, and performs air conditioning operation based on the preset temperature. As a result, even when the remote controller is not in the air-conditioning target room, the air-conditioning target room is not excessively cooled, so that useless operation can be prevented.

According to another air conditioner of the present invention, the air-conditioner body includes body transmission unit that transmits a response signal to the remote controller in response to reception of the transmission signal transmitted from the remote controller. The remote controller includes remote-controller receiving unit that receives the response signal. When the remote controller transmits the temperature detected by the temperature detecting unit as a transmission signal but does not receive a response signal from the air-conditioner body, it is determined that the remote controller is not in the air-conditioning target room, and a subsequent detected temperature is not transmitted as a transmission signal, so that useless transmission can be prevented.

Therefore, the present invention can provide an effect that useless operation caused by excessive cooling at the time of cooling operation can be prevented based on the determination that the remote controller is not in the air-conditioning target room.

DESCRIPTION OF EMBODIMENT

Hereinafter, an embodiment of the air conditioner according to the present invention will be described in detail with reference to the accompanying drawings. It should be understood that this example is not intended to limit the present embodiment.

Figure 1:
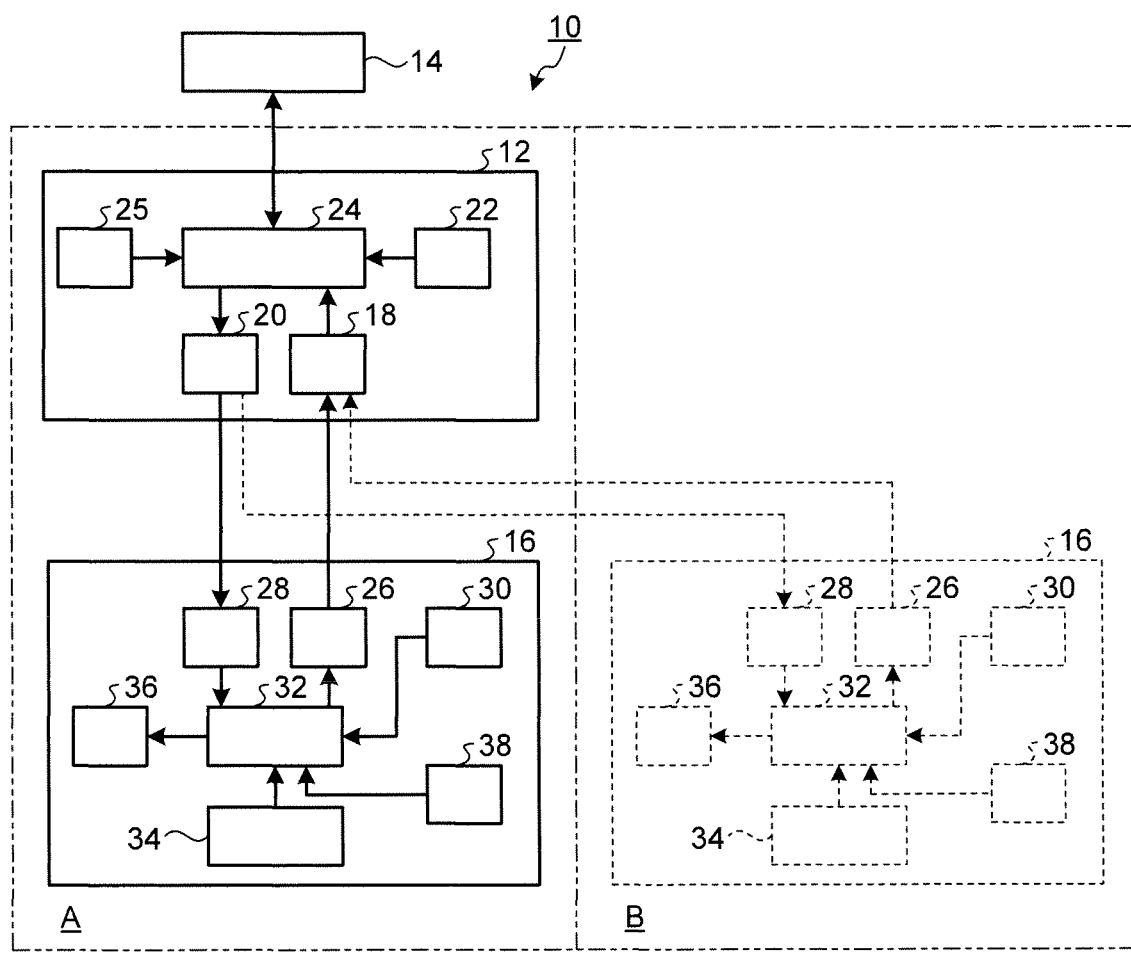
FIG. 1 is a block diagram illustrating an example of an air conditioner according to the present invention.

As illustrated in FIG. 1, an air conditioner 10 according to the present invention includes an indoor unit 12 and an outdoor unit 14 used as an air-conditioner body, and a remote controller 16.

The indoor unit 12 includes body receiving unit 18 that receives an operation signal for operating the indoor unit 12 from the remote controller 16, body transmission unit 20 that transmits operation information on the indoor unit 12 and the outdoor unit 14 to the remote controller 16, a room temperature sensor 22 that detects temperatures around the indoor unit, timer unit 25, a fan not illustrated, and control unit 24 that controls these components.

Figure 2:
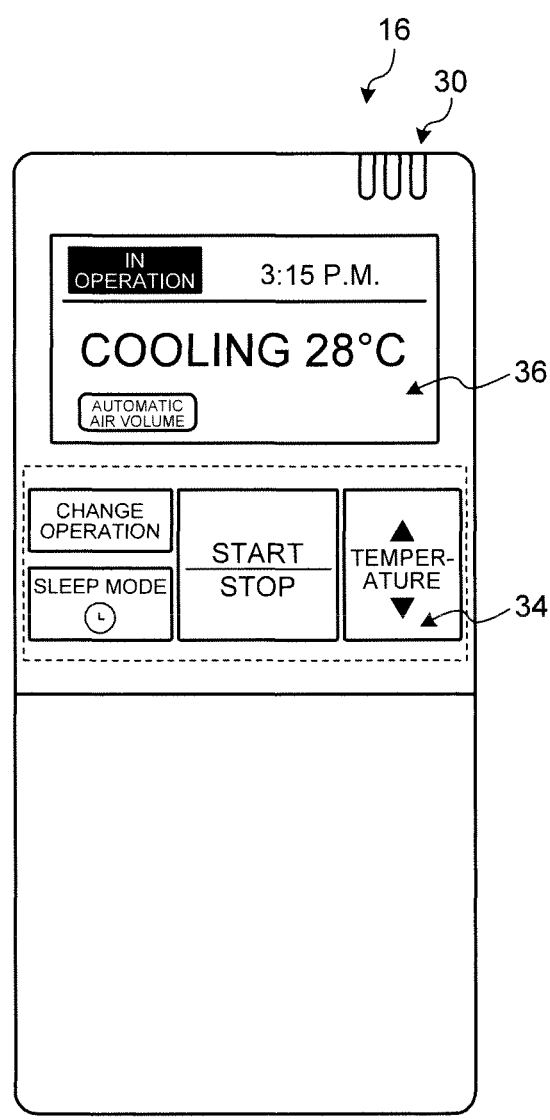
FIG. 2 is a diagram illustrating one example of a remote controller of the air conditioner according to the present invention.

The remote controller 16 is an apparatus using a bidirectional radio communication system with an RF module. As illustrated in FIGS. 1 and 2, the remote controller 16 includes a display section 36 for displaying operation information (operation time, power consumption, etc.) on an air-conditioner, an operation section 34 that operates the air-conditioner, remote-controller transmission unit 26 that transmits an operation signal for drive operation and a preset temperature signal to the indoor unit 12, remote-controller receiving unit 28 that receives the operation information on the indoor unit 12 and the outdoor unit 14 transmitted from the indoor unit 12, a temperature sensor 30 (temperature detecting unit) that detects temperatures around the remote-controller transmission unit 26 and the remote-controller receiving unit 28, remote-controller timer unit 38 that counts time, and remote-controller control unit 32 that controls these components. The temperature detected by the temperature sensor 30 (hereinafter referred to as a remote-controller-sensor temperature) may be regarded as a room temperature of the place where a user is present. The remote-controller-sensor temperature by the temperature sensor 30 is transmitted to the body receiving unit 18 in the indoor unit 12 via the remote-controller transmission unit 26 at predetermined time intervals (for example, 5-minute intervals) counted by the remote-controller timer unit 38. A transmission and reception section of the remote controller 16 is usually turned off to prevent consumption of a battery to be used. Therefore, communication between the remote controller 16 and the indoor unit 12 is always started after the operation signal is transmitted from the remote controller 16 to the indoor unit 12 that is an operation target.

The control unit 24 of the indoor unit 12 operates the air conditioner based on a preset temperature predetermined. More specifically, in order to air-condition the room so that the room temperature reaches the preset temperature transmitted by the remote controller 16, the control unit 24 controls the air-conditioner body while monitoring the room temperature sensor 22 so that the temperature detected by the room temperature sensor 22 becomes closer to the preset temperature. The above control is performed by such operation as adjusting the revolution speed of a fan (not illustrated), and/or the revolution speed of a compressor of the outdoor unit 14.

When a temperature difference between the preset temperature and the remote-controller-sensor temperature is detected, the control unit 24 controls the air-conditioner body so as to reduce the temperature difference. In this case, when the remote controller 16 and the indoor unit 12 are in the same room, the room temperature becomes closer to the preset temperature. However, in the case of, for example, cooling operation, if the remote controller 16 is in another room where air-conditioning is not performed, the state of the remote-controller-sensor temperature being higher than the preset temperature tends to continue since the temperature outside the air-conditioned room is generally higher.

Accordingly, in the present invention, when the remote-controller-sensor temperature is lower than the preset temperature at the time of cooling operation, and when the remote-controller-sensor temperature is higher than the preset temperature at the time of heating operation, the control unit 24 determines that the remote controller 16 and the indoor unit 12 are likely to be in the same room. Based on this determination, air-conditioning operation by the air-conditioner body is controlled so as to reduce the temperature difference between the preset temperature and the remote-controller-sensor temperature.

At the time of cooling operation, it is preferable to correct the preset temperature to be higher when the remote-controller-sensor temperature is lower than the preset temperature, whereas at the time of heating operation, when the remote-controller-sensor temperature is higher than the preset temperature, it is preferable to correct the preset temperature to be lower. More specifically, the correction is implemented as shown below.

[Cooling Operation]

Figure 3:
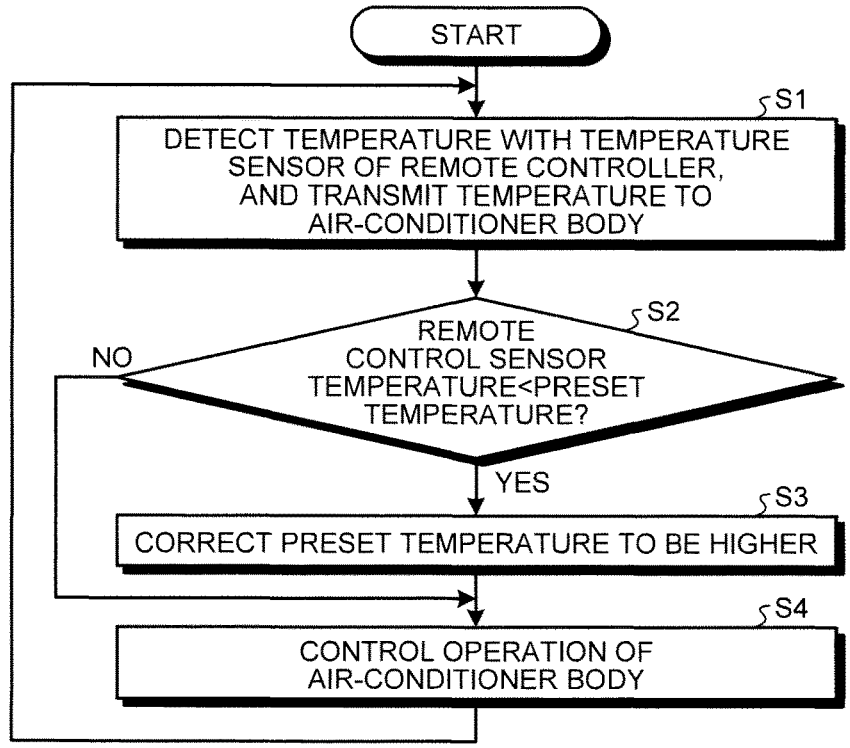
FIG. 3 is a flow chart of cooling operation by the air conditioner according to the present invention.

First, at the time of cooling operation, the remote controller 16 transmits a remote-controller-sensor temperature detected by the temperature sensor 30 as a transmission signal to the air-conditioner body 12 (step S1) as illustrated in FIG. 3. The control unit 24 of the air-conditioner body 12 receives the transmission signal of the remote-controller-sensor temperature. When the remote-controller-sensor temperature is lower than the preset temperature (YES at step S2), the control unit 24 of the air-conditioner body 12 corrects the preset air-conditioning temperature, which is preset for the air-conditioner body, to be higher (step S3), and controls the operation of the air-conditioner body with the corrected preset temperature (step S4). When the remote-controller-sensor temperature is higher than the preset temperature in step S2 (NO at step S2), controlling process jumps to the operation control performed by the air-conditioner body (step S4) without correcting the preset temperature with the remote-controller-sensor temperature, and the controlling process returns to S1.

In one specific example, when the preset temperature is 28° C. and the remote-controller-sensor temperature is 26° C., which is lower than the preset temperature by 2° C., the preset temperature may be corrected to be 29° C. by increasing the temperature by 1° C. The operation control of the air-conditioner body may be performed with this new preset temperature of 29° C.

When the remote-controller-sensor temperature is higher than the preset temperature in cooling operation, the air conditioner is controlled to increase the cooling capacity so that the temperature difference is reduced. In this case, when the remote controller 16 is not in an air-conditioning target room A but in a room B, as illustrated in FIG. 1, the remote-controller-sensor temperature is not indicative of the room temperature of the air-conditioning target room A. This brings about a problem of failure to reduce the temperature difference despite the cooling operation, while the air-conditioning target room A is excessively cooled by useless operation.

However, in the present invention, the air conditioner is controlled to decrease the cooling capacity so as to reduce the temperature difference between the preset temperature and the remote-controller-sensor temperature only when the remote-controller-sensor temperature is lower than the preset temperature. Consequently, the air-conditioning target room A is not excessively cooled, so that useless operation is prevented and energy saving is achieved even if the remote controller 16 is not in the air-conditioning target room A but in the room B as illustrated in FIG. 1.

[Heating Operation]

Figure 4:
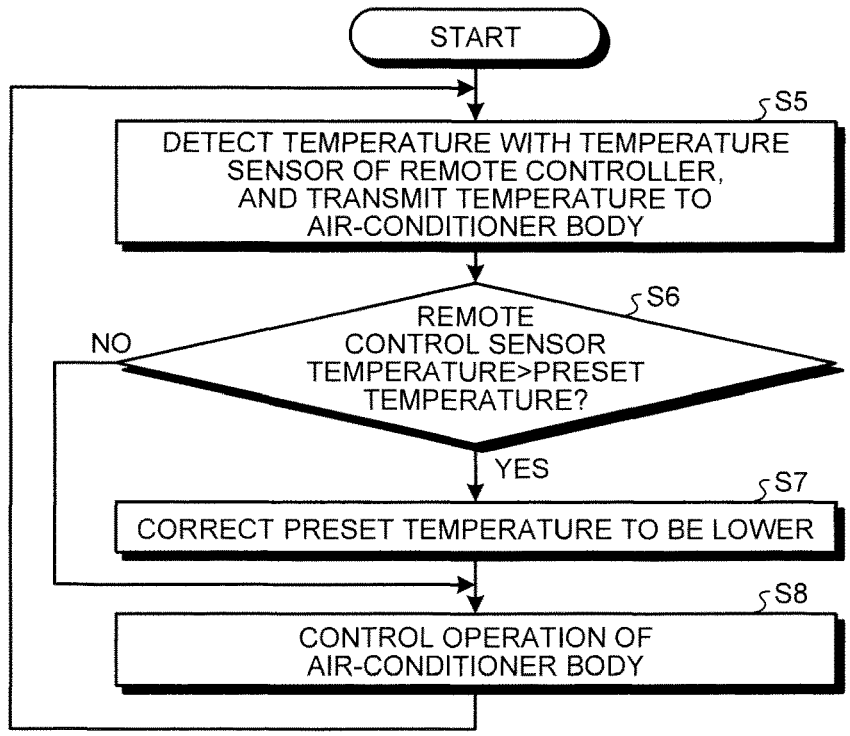
FIG. 4 is a flow chart of heating operation by the air conditioner according to the present invention.

At the time of heating operation, the remote controller 16 transmits a remote-controller-sensor temperature detected by the temperature sensor 30 as a transmission signal to the air-conditioner body 12 (step S5) as illustrated in FIG. 4. The control unit 24 of the air-conditioner body 12 receives the transmission signal of the remote-controller-sensor temperature. When the remote-controller-sensor temperature is higher than the preset temperature (YES at step S6), the control unit 24 of the air-conditioner body 12 corrects the air-conditioning preset temperature, which is preset for the air-conditioner body, to be lower (step S7), and controls the operation of the air-conditioner body with the corrected preset temperature (step S8). When the remote-controller-sensor temperature is lower than the preset temperature in step S6 (NO at Step S6), controlling process jumps to the operation control performed by the air-conditioner body (step S8) without correcting the preset temperature with the remote-controller-sensor temperature, and the controlling process returns to S5.

In one specific example, when the preset temperature is 28° C. and the remote-controller-sensor temperature is 30° C., which is 2° C. higher than the preset temperature, the preset temperature may be corrected to 27° C. by lowering the temperature by 1° C. The operation control of the air-conditioner body may be performed with this new preset temperature of 27° C.

When the remote-controller-sensor temperature is lower than the preset temperature in heating operation, the air conditioner is controlled to increase the heating capacity so that the temperature difference is reduced. In this case, when the remote controller 16 is not in an air-conditioning target room A but in a room B, as illustrated in FIG. 1, the remote-controller-sensor temperature is not indicative of the room temperature of the air-conditioning target room A. This brings about a problem of failure to reduce the temperature difference despite the heating operation, while the air-conditioning target room A is excessively heated by useless operation.

However, in the present invention, the air conditioner is controlled to decrease the heating capacity so as to reduce the temperature difference between the preset temperature and the remote-controller-sensor temperature only when the remote-controller-sensor temperature is higher than the preset temperature. Consequently, the air-conditioning target room A is not excessively heated, so that useless operation is prevented and energy saving is achieved even if the remote controller 16 is not in the air-conditioning target room A but in the room B as illustrated in FIG. 1.

Therefore, the present invention can prevent excessive cooling at the time of cooling operation and excessive heating at the time of heating operation.

[Determining Presence of Remote Controller in Same Room]

A description will now be given to a method for determining whether the remote controller is in the air-conditioning target room or not.

When a temperature difference between a detected temperature, which is detected by the temperature sensor 30 and transmitted from the remote controller 16, and a preset temperature is equal to or more than a first predetermined temperature (for example, 5° C.) and the state of the first predetermined temperature has continued for a first predetermined period (for example, 15 minutes) as counted by the timer unit 25, i.e., when the detected temperature does not reach the preset temperature despite the air-conditioning operation, the control unit 24 of the air-conditioner body 12 determines that the remote controller 16 is not in the air-conditioning target room. Accordingly, the control unit 24 performs air-conditioning operation not based on the remote-controller-sensor temperature but based on the preset temperature.

When the detected temperature, which is detected by the temperature sensor 30 and transmitted from the remote controller 16, has changed by a second predetermined temperature (for example, 3° C.) or more within a second predetermined period (for example, 10 minutes) as counted by the timer unit 25, i.e., when the detected temperature has abruptly changed in a short period of time, the control unit 24 of the air-conditioner body 12 determines that the remote controller has been moved out of the air-conditioning target room and is not in the air-conditioning target room. Accordingly, the control unit 24 performs air-conditioning operation not based on the remote-controller-sensor temperature but based on the preset temperature.

In the above case, the determination is made based on the time counted by the timer unit 25 of the air-conditioner body 12. However, the determination may be made based on the presence of a significant change (for example, 3° C. or more) in the detected temperature, transmitted from the remote controller 16, between a previously detected temperature and a currently detected temperature.

The air-conditioner body 12 transmits a response signal from the body transmission unit 20 to the remote controller 16 in response to reception of the transmission signal from the remote controller 16. When the response signal from the air-conditioner body 12 is received in the remote-controller receiving unit 28, the remote controller 16 determines that the remote controller 16 is within an operation target range. Therefore, when the remote controller 16 transmits the detected temperature detected by the temperature sensor 30 to the air-conditioner body 12 but does not receive a response signal from the air-conditioner body 12, the remote controller 16 is determined to be out of the operation target range, i.e., out of the air-conditioning target room. Accordingly, transmission of a subsequent detected temperature by the remote controller 16 is stopped. When the detected temperature from the remote controller 16 is not received for a given period of time, the control unit 24 of the air-conditioner body 12 performs air-conditioning operation not based on the remote-controller-sensor temperature but based on the preset temperature.

In the above-described embodiment, a bidirectional wireless communication system is used between the remote controller 16 and the air-conditioner body (indoor unit 12) to enable the display section 36 of the remote controller 16 to display the operation information on the air-conditioner body (for example, information on electricity bill after the operation is over and on maintenance operation such as filter cleaning). However, in the present invention, the remote controller 16 does not need to use the function of bidirectional communication, and may perform only transmission of the transmission signal.

As described in the foregoing, according to the air-conditioner of the present invention, in the cooling operation, air-conditioning operation by the air-conditioner body is controlled only when at least the detected temperature is lower than the preset temperature so as to reduce the temperature difference between the preset temperature and the detected temperature (control to decrease the cooling capacity) in order to prevent useless operation, which occurs in a situation where, when the detected temperature is higher than the preset temperature in cooling operation, operation control (control to increase the cooling capacity) of the air-conditioner body is performed so as to reduce the temperature difference, and when the remote controller is not in an air-conditioning target room, since the detected temperature is not indicative of the room temperature of the air-conditioning target room, the temperature difference is not reduced despite the cooling operation, while the air-conditioning target room is excessively cooled.

According to another air conditioner of the present invention, when a temperature difference between the detected temperature and the preset temperature is equal to or more than a first predetermined temperature and the state of the first predetermined temperature has continued for a predetermined first period, the air-conditioner body determines that the remote controller is not in the air-conditioning target room, and performs air-conditioning operation based on the preset temperature. As a result, even when the remote controller is not in the air-conditioning target room, the air-conditioning target room is not excessively cooled, so that useless operation can be prevented.

According to another air conditioner of the present invention, when the detected temperature has changed by a second predetermined temperature or more during a second predetermined period, the air-conditioner body determines that the remote controller has been moved out of the air-conditioning target room, and performs air conditioning operation based on the preset temperature. As a result, even when the remote controller is not in the air-conditioning target room, the air-conditioning target room is not excessively cooled, so that useless operation can be prevented.

According to another air conditioner of the present invention, the air-conditioner body includes the body transmission unit that transmits a response signal to the remote controller in response to reception of the transmission signal from the remote controller. The remote controller includes the remote-controller receiving unit that receives the response signal. When the remote controller transmits a temperature detected by the temperature detecting unit but does not receive the response signal from the air-conditioner body, the remote controller determines that the remote controller is not in the air-conditioning target room, and refrains from transmitting a subsequent detected temperature, so that useless transmission and consumption of a battery can be prevented.

Therefore, the present invention can provide an advantage that useless operation caused by excessive cooling at the time of cooling operation can be prevented based on the determination that the remote controller is not in the air-conditioning target room.

Industrial Applicability

As described in the foregoing, the air conditioner according to the present invention is useful for an air conditioner that uses a temperature detected by the temperature sensor included in the remote controller as a room temperature and performs operation control based on the room temperature. The air conditioner according to the present invention is particularly suitable for an air conditioner using an RF remote controller that employs a bidirectional radio-communication radio wave with an RF module.

REFERENCE SIGNS LIST

10 Air conditioner
12 Indoor unit (air-conditioner body)
14 Outdoor unit (air-conditioner body)
16 Remote controller
18 Body receiving unit
20 Body transmission unit
22 Room temperature sensor
24 Control unit
25 Timer unit
26 Remote-controller transmission unit
28 Remote-controller receiving unit
30 Temperature sensor
32 Remote-controller control unit
34 Operation section (operation unit)
36 Display section (display unit)
38 Remote-controller timer unit

The invention claimed is:

1. An air conditioner, comprising:
an air-conditioner body that performs an air-conditioning operation; and
a remote controller that operates the air-conditioner body, wherein
the air-conditioner body receives a transmission signal from the remote controller,
the remote controller detects a temperature around the remote controller and transmits the detected temperature as the transmission signal by means of a radio wave at predetermined time intervals,
at a time of cooling operation, in response to a determination that the remote controller and the air-conditioner body are in a same room in accordance with a predetermined difference between a previous temperature and a current temperature detected by the remote controller, the air-conditioner body compares the detected temperature received from the remote controller and a preset temperature predetermined, and when the detected temperature is lower than the preset temperature, the air-conditioner body corrects the preset temperature, which is preset for the air-conditioner body, to be higher and controls the operation of the air-conditioner body with the corrected preset temperature,
the air-conditioner body includes a timer,
when the air-conditioner body receives the detected temperature from the remote controller and when the detected temperature has changed by a first predetermined temperature or more within a first predetermined period counted by the timer, the air-conditioner body operates based on the preset temperature,
when the detected temperature has changed by the first predetermined temperature or more during the first predetermined period, the air-conditioning body determines that the remote controller is moved out of an air-conditioning target room and performs the air conditioning operation based on the preset temperature,
the air-conditioner body is controlled to decrease a cooling capacity so as to reduce a temperature difference between the preset temperature and the detected temperature only when the detected temperature is lower than the preset temperature when the remote controller is not in the air-conditioning target room, the detected temperature is not indicative of a room temperature of the air-conditioning target room, and the temperature difference is not reduced despite the cooling operation, and
the detected temperature is detected by a temperature sensor that the remote controller has.

2. The air conditioner according to claim 1, wherein when the temperature difference between the detected temperature and the preset temperature being equal to or more than a second predetermined temperature is maintained during a second predetermined period counted by the timer-the air-conditioning body operates the air-conditioner body based on the preset temperature.

3. The air conditioner according to claim 1, wherein the air-conditioner body transmits a response signal to the remote controller in response to reception of the transmission signal transmitted from the remote controller,
the remote controller receives the response signal, and
when the remote controller fails to receive the response signal from the air-conditioner body, the remote controller refrains from transmitting a subsequent detected temperature as a transmission signal.

4. An air conditioner, comprising:
an air-conditioner body that performs air-conditioning operation; and
a remote controller that operates the air-conditioner body, wherein
the air-conditioner body performs operation control of the air-conditioner body and receives a transmission signal from the remote controller,
the remote controller detects a temperature around the remote controller and transmits the temperature detected by the remote controller as the transmission signal by means of a radio wave at predetermined time intervals,
at a time of cooling operation, in response to a determination that the remote controller and the air-conditioner body are in a same room in accordance with a predetermined difference between a previous temperature and a current temperature detected by the remote controller, the air-conditioning body compares the detected temperature received from the remote controller and a preset temperature predetermined,
the air-conditioner body includes a timer, when the air-conditioning body receives the detected temperature from the remote controller and when the detected temperature has changed by a first predetermined temperature or more within a first predetermined period counted by the timer, the air-conditioner body operates based on the preset temperature, when the detected temperature has changed by the first predetermined temperature or more during the first predetermined period, the air-conditioning body determines that the remote controller is moved out of an air-conditioning target room, and perform the air conditioning operation based on the preset temperature, the air-conditioner body is controlled to decrease a cooling capacity so as to reduce a temperature difference between the preset temperature and the detected temperature only when the detected temperature is lower than the preset temperature when the remote controller is not in the air-conditioning target room, the detected temperature is not indicative of a room temperature of the air-conditioning target room, and the temperature difference is not reduced despite a cooling operation, and the detected temperature is detected by a temperature sensor that the remote controller has.

5. The air conditioner according to claim 4, wherein when the temperature difference between the detected temperature and the preset temperature being equal to or more than a second predetermined temperature is maintained during a second predetermined period counted by the timer, the air-conditioner body operates based on the preset temperature.

6. The air conditioner according to claim 4, wherein the air-conditioner body transmits a response signal to the remote controller in response to reception of the transmission signal transmitted from the remote controller, the remote controller receives the response signal, and when the remote controller fails to receive the response signal from the air conditioner body, the remote controller refrains from transmitting a subsequent detected temperature as a transmission signal.

* * * * *